United States Patent [19]

Staschewski

[11] Patent Number: 5,489,056
[45] Date of Patent: Feb. 6, 1996

[54] ENDLESS CHAIN CONVEYING DEVICE WITH SPRING BIASED WEDGE TENSIONER

[75] Inventor: Harry Staschewski, Langenhagen, Germany

[73] Assignee: kabelmetal electro GmbH, Germany

[21] Appl. No.: 156,027

[22] Filed: Nov. 19, 1993

[30] Foreign Application Priority Data

Dec. 3, 1992 [DE] Germany ............ 42 40 654.4

[51] Int. Cl.[6] .................................. B65H 20/00
[52] U.S. Cl. .................... 226/173; 474/138; 474/117
[58] Field of Search ......................... 226/173, 170, 226/172, 174, 179; 474/117, 138, 135

[56] References Cited

U.S. PATENT DOCUMENTS

| 1,815,954 | 7/1931 | Opie | 474/138 |
| 3,310,213 | 3/1967 | Gretter | 226/173 |
| 3,351,034 | 11/1967 | Grek | 226/173 |
| 4,079,834 | 3/1978 | Fletcher, Jr. et al. | 198/810 |

FOREIGN PATENT DOCUMENTS

| 0112464 | 4/1984 | European Pat. Off. . |
| 908769 | 10/1962 | United Kingdom . |

OTHER PUBLICATIONS

Brochure—UNIWEMA® Machines and Accessories.

*Primary Examiner*—John P. Darling
*Assistant Examiner*—Thomas E. Dunn
*Attorney, Agent, or Firm*—Ware, Fressola, Van Der Sluys & Adolphson

[57] ABSTRACT

A conveying device for transportation of extended line products such as cables or tubes has tension elements to exert a tension force on at least two tension chain wheels in the direction away from the driving chain wheels. A self-locking wedge prevents the tension chain wheels from moving back and forth. The automatic adjustment of the roller chains reduces wear of the conveying device and prevents speed changes during transportation of the extended line product.

11 Claims, 4 Drawing Sheets

ENDLESS CHAIN CONVEYING DEVICE WITH SPRING BIASED WEDGE TENSIONER

BACKGROUND OF THE INVENTION

1. Field of the Invention

The invention relates to a conveying device for extended line products, such as cables or tubes, which has a conveying device housing and parallel running, driveable endless roller chains. A number of collet chucks are mounted on the roller chains to grip the extended line product. Each roller chain extends around a stationary driving chain wheel and a tension chain wheel in an endless drive path. The tension chain wheels are located in bearing housings and can move together with the bearing housings, with respect to the driving chain wheels, to tension the endless roller chains.

2. Description of the Prior Art

A conveying device for extended line products, for example for welded tubes, is known from the February 1992 publication "Uniwema Machines and Accessories" by Kabelmetal Electro GmbH. With this known conveying device, the roller chains, on which the collet chucks are mounted, must be manually retensioned, because of the wear caused during operation. If this retensioning is not timely performed, the roller chains are too loose on the chain wheels thereby increasing the wear of the roller chains and chain wheels.

If a collet chuck gripping the extended line product opens while the extended line product is being pulled, e.g. by a corrugated sheath machine, the next collet chuck in the drive direction of the roller chains must supply a larger portion of the required pulling force on the extended line product. If the roller chains are insufficiently tensioned in this operating instance, the sudden tension forces caused by the increased pulling force on the extended line product produces sudden changes in velocity thereof in the driving direction of the roller chains. These changes in velocity of the pulled-off extended line product could possibly produce manufacturing defects, such as welding defects in the extended line product, when using a known conveying device in a universal corrugated sheath machine in accordance with the above cited publication.

Furthermore, with manual retensioning of the roller chains, there is the danger of overstressing the roller chains.

SUMMARY OF THE INVENTION

An object of the present invention is to provide a conveying device for extended line products with automatic retensioning of the driveable endless roller chains thereby eliminating manual retensioning.

The present invention provides a conveying device having at least one spring-loaded tension element which exerts a tension force on the moveable tension chain wheels in the direction away from the driving chain wheels. A self-locking wedge is allocated to each tension chain wheel and is pulled into a gap formed between a moveable bearing housing for the respective tension chain wheel and a stationary wedge guide facing the tension chain wheel.

The invention allows the roller chains to be automatically retensioned thereby avoiding any undesired movement, such as a back and forth flutter of the moveable bearing housings due to briefly increased tension forces in the roller chains. The automatic retensioning of the roller chains leads to decreased wear of the roller chains and chain wheels and avoids undesirable speed changes in the extended line product resulting from changes in the tension force of the roller chains during operation.

In addition, such a conveying device according to the invention is simple to produce.

To provide a particularly simple construction of the conveying device according to the invention, the bearing housings of the tension chain wheels are located in connecting link guides in the conveying device housing so they can move in the longitudinal direction of the roller chains toward and away from the driving chain wheels.

It is advantageous if the tension force of at least one tension element is adjustable. In this way, too large or too small a tension of the roller chains is avoided.

To obtain a reliable indication of unacceptable chain elongation, it is advantageous to provide at least one proximity switch to act in conjunction with a bearing housing of a tension chain wheel.

For a very simple construction of the conveying device according to the invention, it is advantageous if at least one tension element is a compression spring and the tension elements acting on the wedges are tension springs.

The invention will be fully understood when reference is made to the following detailed description taken in conjunction with the accompanying drawings.

DETAILED DESCRIPTION OF THE INVENTION

Figure 1:
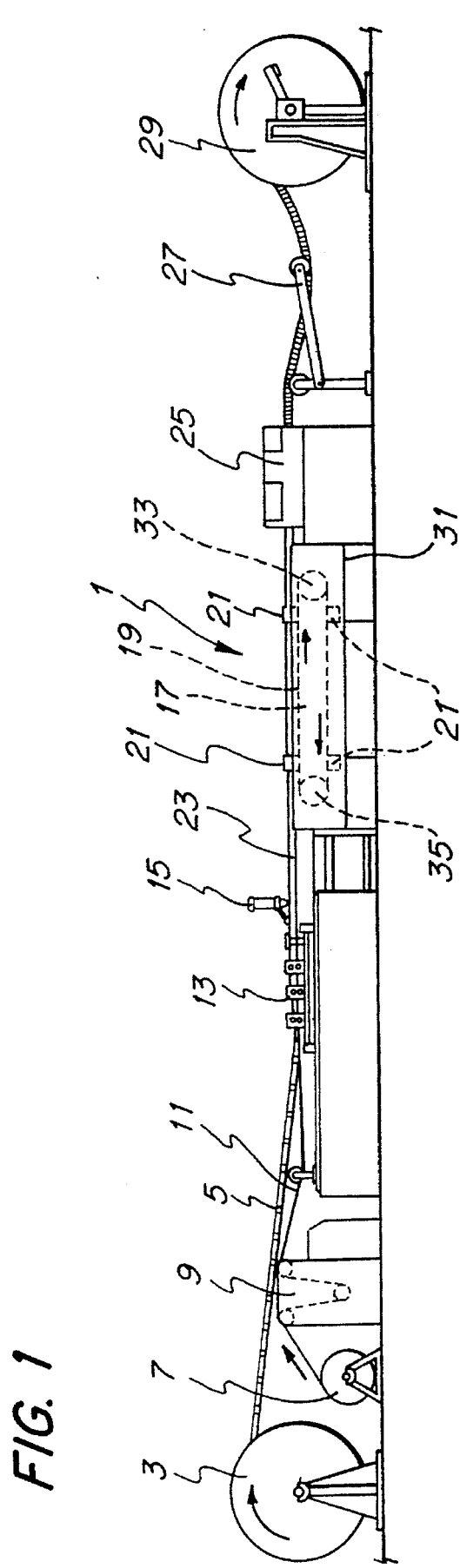
FIG. 1 shows a corrugated sheath machine with a conveying device according to the invention.

Turning first to FIG. 1 of the drawings, therein illustrated is a corrugated sheath machine 1 for the production of cable sheaths from a metal tape. The corrugated sheath machine 1 is provided with an unwinder 3 for a cable core 5 along with a discharge frame 7 and cleaning device 9 for a metal tape or strip 11. A shaping tool 13 forms the metal tape 11 around the cable core 5. Subsequently, a welding installation welds the formed metal tape along the lengthwise seam thereof into a tube that surrounds the cable core 5 to form an extended product line 23. A conveying device 17 that is built according to the invention follows the welding installation 15 and draws the extended product line 23 (the welded tube, the cable core 5 and the surrounding metal tape 11) through the corrugated sheath machine 1 at a constant speed. For this purpose, the conveying device 17 has two driveable, parallel running, endless roller chains 19 with a number of collet chucks 21 mounted thereon which tightly grip the extended line product 23. The pressure of the collet chucks 21 is adjustable to prevent pressure marks from the collet chucks 21 on the extended line product 23. In addition, the collet chucks 21 are subject to torsion forces, which are exerted on the extended line product 23 during the subsequent corrugating process by a corrugation device 25.

The conveying device 17 according to the invention has an extended line conveying device housing 31 in which the two driveable, endless roller chains 19 are located. The two driveable, endless roller chains 19 run in two endless drive paths approximately parallel to each other. One half collet of the collet chucks 21 is securely attached to one of the roller chains 19 and the other half to the other roller chain 19. The two-part collet chucks 21 in the conveying device housing 31 circulate in the conveying device housing 31 to transport the extended line product 23 through the corrugated sheath machine 1 and are guided in the conveying device housing 31 to securely grip the extended line product 23 at the proper time and also release it at the proper time.

Figure 3:
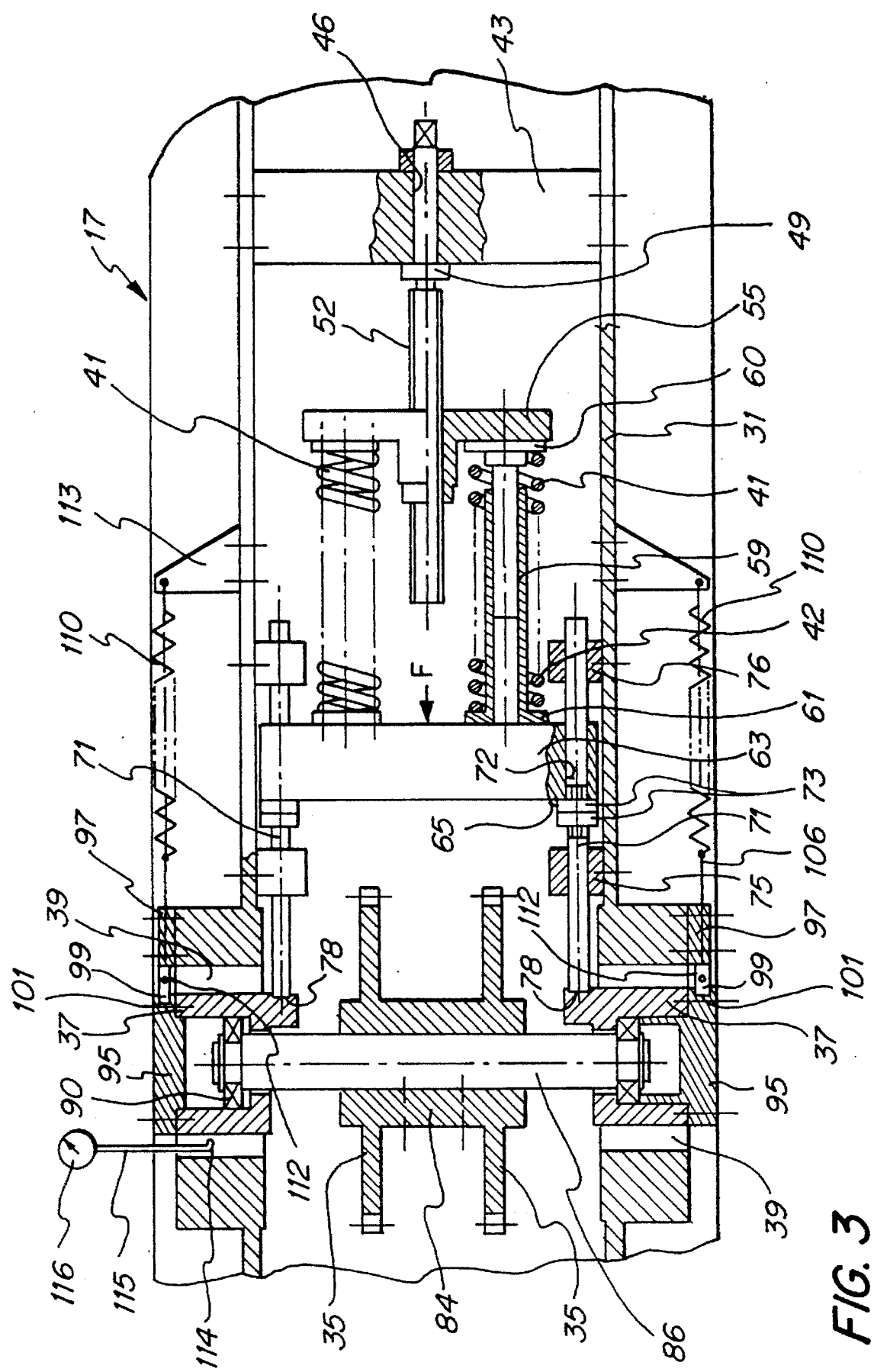
FIG. 3 is a sectional view along line III—III in FIG. 2.
Figure 4:
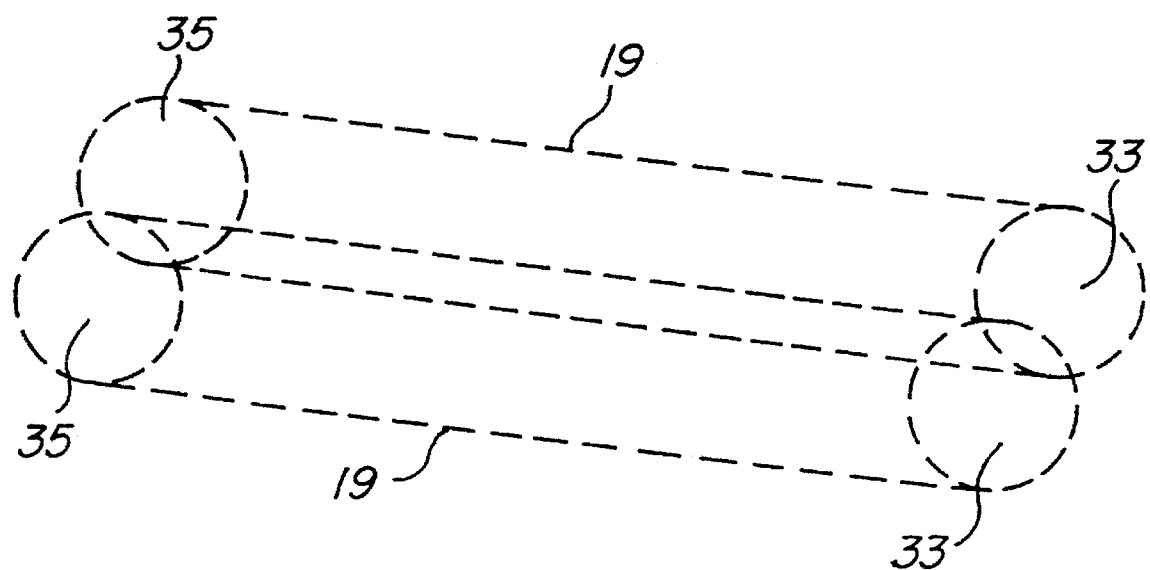
FIG. 4 is a diagrammatic perspective view of the drive chain wheels, tension chain wheels and the two endless drive paths.

Each of the two parallel running, endless roller chains 19 is driven by a rotatable driving chain wheel 33 which is fixedly mounted in a radial direction in the conveying device housing 31. As seen in FIG. 4, each endless roller chain 19 runs around a tension chain wheel 35 which is paired with one of the driving chain wheels 33 to form two pairs of wheels defining the endless drive paths for the endless roller chains 19. The tension chain wheels 35 are located in the conveying device housing 31 at an end opposite from the driving chain wheels 33. As shown in FIG. 3, the two tension chain wheels 35 are part of a tension wheel 84, which is securely attached to a tension chain wheel shaft 86. In turn, the tension chain wheel shaft 86 is located in bearing housings 37 inside the conveying device housing 31, where it rotates by means of slide or roller bearings 90. To enable movement of the bearing housings 37 with the tension chain wheels 35 and the tension wheel 84 with respect to the driving chain wheels 33, a connecting link guide 39 with an elongated hole is provided in the conveying device housing 31 for each bearing housing 37, whereby bearing housings 37 of a tension chain wheel 35 can move in the longitudinal direction of the roller chains 19 toward and away from the driving chain wheels 33.

The conveying device 17 according to the invention has two parallel tension elements 41 acting on the bearing housings 37. The tension elements 41 are compression springs, but may also be tension springs, hydraulic elements or pneumatic elements. The two tension elements 41 exert a tension force F (FIG. 3), in the direction facing away from the driving chain wheels 33, on the two bearing housings 37 of the tension chain wheels 35 which can move in the connecting link guides 39. The force is intended to maintain tension on the two roller chains 19.

A support element 43 is mounted in and securely attached to the conveying device housing 31. One end of an adjusting screw 49 is located in a bore 46 of the support element 43. On one side of the support element 43, the adjusting screw 49 has a threaded section 52, with which the adjusting screw 49 is screwed into a moveable support bridge 55. By rotating the adjusting screw 49, the position of the support bridge 55 with respect to the support element 43 can be adjusted along with the initial tension in the tension elements 41. The maximum allowable tensile load of the roller chains 19 must be taken into consideration in the design and adjustment of the initial tension of the tension elements 41.

The tension elements 41 are arranged around telescope-shaped spring mandrels 59 on the support bridge 55 and are supported at one of their ends on the support bridge 55 by first spring plates 60 of the spring mandrels 59. The other ends of the tension elements 41 are supported on a transfer bridge 63 by second spring plates 61 of the spring mandrels 59 with their ends 42 facing the bearing housings 37 of the tension chain wheels 35. In turn, the transfer bridge 63 is supported by the support nuts 73 of two pressure bolts 71, one allocated to each bearing housing 37, on the installation front 65 which faces the bearing housings 37.

The pressure bolts 71 extend through a passage bore 72 in the transfer bridge 63 and are kept parallel to each other in the longitudinal direction of the conveying device housing 31 by guide blocks 75, 76. The guide blocks 75 are located on the side of the transfer bridge 63 that faces the bearing housings 37 while the guide blocks 76 are located on the side of the transfer bridge 63 that faces away from the bearing housings 37. The guide blocks 75, 76 all are securely attached to the conveying device housing 31. The pressure bolts 71 have front ends 78 facing away from the support element 43 engaging the bearing housings 37 of the tension chain wheels 35. By means of the transfer bridge 63 and the pressure bolts 71, the tension elements 41 are designed to move the bearing housings 37 in the connecting link guides 39 of the conveying device housing 31 thereby moving the tension chain wheel shaft 86 and the tension chain wheels 35 in the direction away from the driving chain wheels 33.

For each bearing housing, a stationary wedge guide element 97 is securely mounted in the conveying device housing 31 next to the bearing covers 95 of the bearing housings 37 and opposite the side facing the driving chain wheels 33 and support element 43. Located between each bearing cover 95 and the corresponding wedge guide element 97 is a moveable wedge 99, which is tapered in its pulling direction, e.g. downwards. A guidance groove 101 formed in the bearing cover 95 serves to guide the wedge 99. Like wedge 99, this guidance groove 101 is inclined in the pulling direction of the wedge 99. The gap between the bottom of the guidance groove 101 of bearing cover 95 and the wedge guide element 97, which tapers in the pulling direction of the wedge in accordance with the guidance groove 101, is designated as gap 112.

Figure 2:
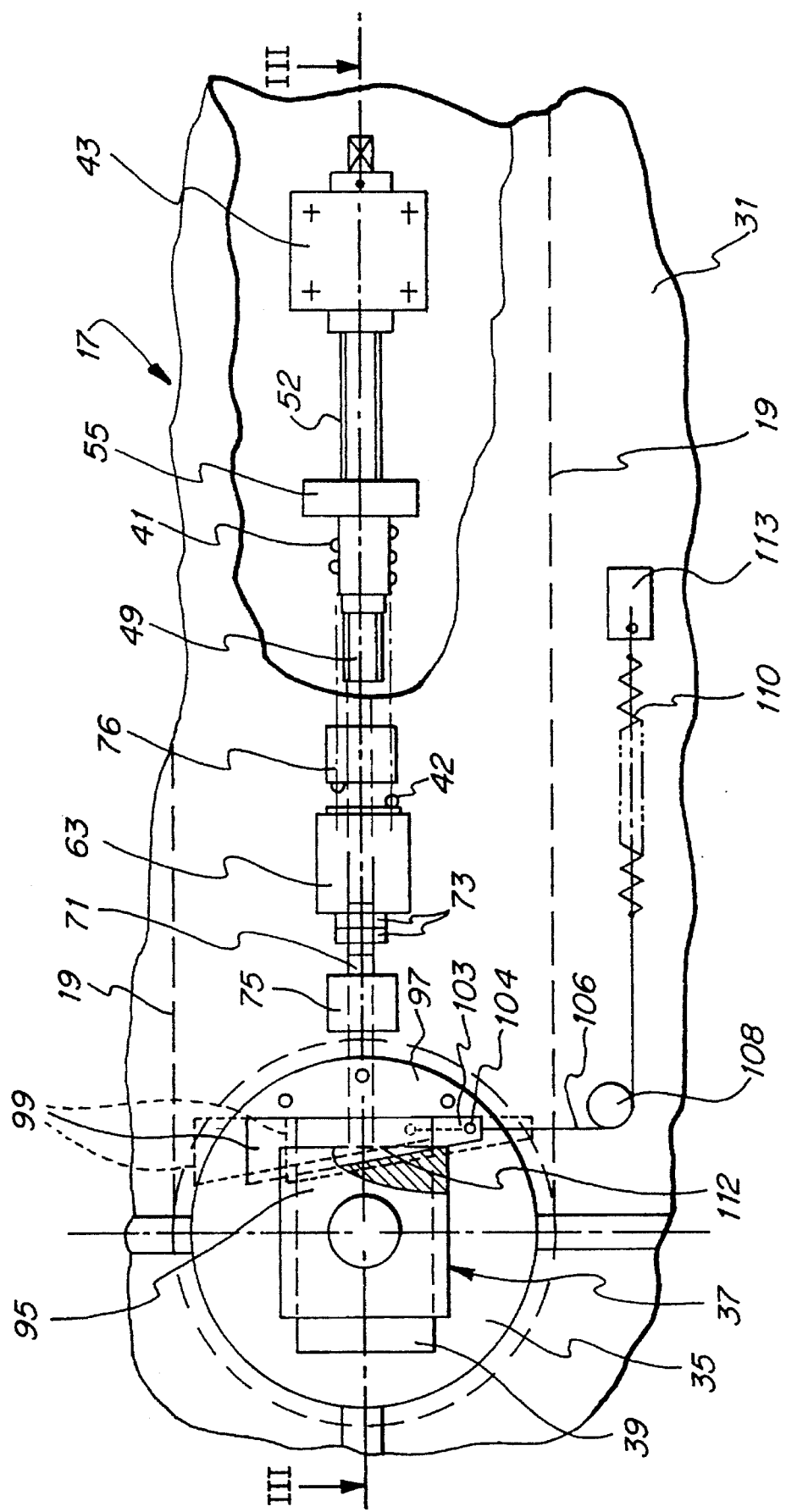
FIG. 2 is a side elevational view of the conveying device according to the invention with portions broken away to illustrate internal structure.

Each wedge 99 has a bore 104 at one tapered end 103 thereof. One end of a wire 106 passes through the bore 104 and is connected to the wedge 99. The wire 106 passes around a rotating deflection pulley 108 attached to the conveying device housing 31 and serves to deflect the wire 106 by 90°. The other end of wire 106 is connected to one end of a tension element 110. The other end of the tension element 110 is attached to a holding arm 113 located on the conveying device housing 31. The tension element 110 could be a draw spring, but it is equally possible to provide other known tension elements to create a tensile load on the wedge 99. The tension element 110 is designed to draw the wedge 99 by means of the wire 106 into the gap 112 between the bearing cover 95 and the wedge guide element 97 to prevent any undesired movement, such as a back and forth oscillation, of the bearing housing 37 with respect to the conveying device housing 31, through the self-actuation of the wedge 99. As indicated by the broken lines in FIG. 2, the wedge 99 in the gap 112 can adopt different positions as a function of the position of the respective bearing housing 37 of the tension chain wheel shaft 86 whereby the wedge 99 moves in the pulling direction of the wire 106 with increasing length of the respective roller chain 19.

In accordance with the invention, a proximity switch 114 is provided at least in one of the two connecting link guides 39 for the bearing housings 37. The proximity switch 114 is connected by a line 115 with an indicator 116 to show whether the bearing housing 37 of the tension chain wheel shaft 86 has come closer to the proximity switch 114 indicating the allowable chain length of the respective roller chain 19 has been exceeded by wear and the roller chain 19 must be replaced.

In using the conveying device 17 according to the invention, the collet chucks 21 grip and move the extended line product 23. The roller chains 19 which carry the collet chucks are automatically retensioned by the tension elements 41 so that not only is the wear of the roller chains 19 and the driving chain wheels 33 and the tension chain wheels 35 reduced but, in addition, the uniformly tensioned roller chains 19 ensure transportation of the extended line product 23 at constant speed through a production installation, such as a corrugated sheath machine. The wedges 99 reliably prevent any back and forth movement of the bearing housings 37 of the tension chain wheel shaft 86 of the tension chain wheels 35, guided by the connecting link guides 39.

It will therefore be seen from the above that the invention provides the device in which automatic adjustment of the roller chains reduces wear of the conveying device and prevents speed changes during transportation of the extended line product.

The preferred embodiment described above admirably achieves the objects of the invention; however, it will be appreciated that departures can be made by those skilled in the art without departing from the spirit and scope of the invention which is limited only by the following claims.

Having thus described the invention, what is claimed is:

1. A conveying device for an extended line product comprising:
   (a) a conveying device housing;
   (b) a rotatable driving chain wheel mechanism fixedly mounted in a radial direction with respect to said conveying device housing;
   (c) a tension chain wheel mechanism spaced from said rotatable driving chain wheel mechanism;
   (d) at least one endless roller chain driveably mounted around said rotatable driving chain wheel mechanism and said tension chain wheel mechanism;
   (e) means mounted on said at least one endless roller chain for gripping the extended line product; and
   (f) means for tensioning said at least one endless roller chain comprising:
      (i) bearing housings rotatably mounting said tension chain wheel mechanism, said bearing housings mounted for moving said tension chain wheel mechanism in a direction away from said driving chain wheel mechanism thereby tensioning said at least one endless roller chain;
      (ii) means for exerting a tension force on said tension chain wheel mechanism in a direction away from said driving chain wheel mechanism to move said bearing housings away from said driving chain wheel mechanism thereby tensioning said at least one endless roller chain, and
      (iii) a self-actuating wedge device allocated to each bearing housing and cooperating with said means for exerting a tension force on said tension chain wheel mechanism, each device including a wedge pulled by a tension element into engagement with its associated bearing housing to prevent movement of its associated bearing housing in a direction toward said rotatable driving chain wheel mechanism as said means for exerting a tension force moves said bearing housings away from said driving chain wheel mechanism.

2. A conveying device as in claim 1, wherein said conveying device housing has connecting link guides for guiding the movement of the bearing housings relative to said driving chain wheel mechanism.

3. A conveying device as in claim 1, wherein the tension force of said means for exerting a tension force is adjustable.

4. A conveying device as in claim 1, wherein said means to exert a tension force acts on said bearing housings carrying said tension chain wheel mechanism through parallel guided pressure bolts.

5. A conveying device as in claim 4, wherein said means to exert a tension force includes at least one spring-loaded tension element acting on said pressure bolts by means of a transfer bridge.

6. A conveying device as in claim 5, wherein said at least one spring-loaded tension element acts between said transfer bridge and a support bridge.

7. A conveying device as in claim 1, wherein said tension element acting on said wedge is a tension spring.

8. A conveying device as in claim 1, further including at least one proximity switch cooperating with one of said bearing housings.

9. A conveying device as in claim 1, wherein said means to exert a tension force includes a compression spring.

10. A conveying device as in claim 1, wherein said tension chain wheel mechanism has two tension chain wheels which are paired with two driving chain wheels thereby forming two pairs of spaced wheels, each said pair defining an endless drive path.

11. A conveying device as in claim 10, wherein said at least one endless roller chain is two endless roller chains, one of said endless roller chains being mounted on each of said pairs of spaced wheels for movement in said endless drive path thereof.

* * * * *